Patented June 13, 1939

2,161,788

UNITED STATES PATENT OFFICE 2,161,788

PHOTOGRAPHIC ANTIHALATION LAYER

Gustav Wilmanns, Wolfen, Bitterfeld, Germany, assignor, by mesne assignments, to Agfa Ansco Corporation, Binghamton, N. Y., a corporation of Delaware No Drawing. Application November 29, 1937, Serial No. 177,068. In Germany September 30, 1937

5 Claims. (Cl. 95—8)

The present invention relates to anti-halation layers.

One of its objects is to provide a photographic material having an improved anti-halation layer. Other objects will appear from the following detailed specification.

Anti-halation layers which are soluble in the usual photographic developing baths have been produced on the back of photographic plates or films by applying a dyestuff in a medium soluble in water and then coating the layer with a protective layer of a varnish soluble in alkali but insoluble in water. Alternatively, the anti-halation dyestuff may be applied in a solution containing a varnish. The varnishes hitherto used for the coating operation or for carrying the dyestuff, for instance the varnishes described in U. S. patent specifications, Nos. 2,075,145 and 2,089,764, and British patent specification No. 437,451, have strongly acid groups, mostly carboxyl groups, in a free form which determine their solubility in the developer. This strongly acid reaction of the anti-halation layer is in certain cases undesirable since their contact with the photographic emulsion is liable to affect the sensitivity of the latter. Moreover, in using certain strongly basic dyestuffs these are liable to form precipitates with the resinous products which gives rise to a loss of effective substance.

These drawbacks are avoided by the present invention which does not use artificial or natural resins containing acid groups in the free form but in the form of anhydride groups. These products are easily attacked in the alkaline developer and are as soluble therein as are the free acids.

The following examples illustrate the invention:

Example 1

In 1000 cc. of acetone are dissolved 6 grams of "Chromgrün G D" (Schultz, Farbstofftabellen, 7th edit., vol. 2, page 56) and 12 grams of mixed polymerizate from vinyl chloride and maleic acid anhydride. This solution is applied to the photographic plate. The layer dissolves rapidly without residue in a weak alkaline developer.

Example 2

In 1000 cc. of ethyl acetate are dissolved 12 grams of mixed polymerizate from vinylbutyl ether and maleic acid anhydride, and 75 grams of "Benzaurin" (Schultz, Farbstofftabellen, 7th edit. No. 837). The red anti-halation layer produced from this solution dissolves rapidly without residue in a weak alkaline developer.

Example 3

In a mixture of 500 cc. of benzene and 500 cc. of acetone are dissolved 50 grams of "Benzaurin" and 30 grams of a product corresponding with the formula

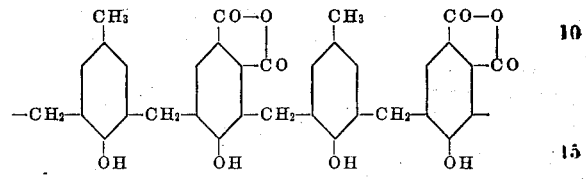

and obtained by condensing 4-hydroxy-phthalic acid with p-cresol-dialcohol dissolved in glacial acetic acid in the presence of sulfuric acid and forming an anhydride by heating the mixture to 180°.

The anti-halation layer which is produced from this solution also dissolves rapidly without residue in a weak alkaline developer.

Example 4

In 1000 cc. of acetone are dissolved 70 grams of aurintricarboxylic acid and 10 grams of mixed polymerizate from styrene and maleic acid anhydride. The layer obtained from the solution dissolves in the same manner as described in Example 2.

Example 5

In a mixture of 500 cc. of methyl-ethyl-ketone and 500 cc. of benzene are dissolved 70 grams of "Benzaurin", and 30 grams of 2.2'-dihydroxy-diphenylmethane-3.4.3'.4'-tetracarboxylic acid anhydride corresponding with the formula

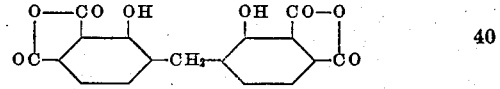

and produced by condensing 3-hydroxy-phthalic acid with formaldehyde and rendering anhydrous the product thus obtained by heating.

The anti-halation layer which is produced from this solution has the same property as that described in Example 2.

What I claim is:

1. A photographic material comprising a support, a light-sensitive emulsion layer, and an anti-halation layer consisting of a resin soluble in alkalies in which the acid groups are in the form of anhydride groups, and an antihalation dyestuff.

2. A photographic material comprising a support, a light-sensitive emulsion layer, and an antihalation layer consisting of a synthetic resin soluble in alkalies in which the acid groups are in the form of anhydride groups, and an antihalation dyestuff.

3. A photographic material comprising a support, a light-sensitive emulsion layer, and an antihalation layer consisting of an interpolymer of vinyl chloride and maleic acid anhydride and of an antihalation dyestuff.

4. A photographic material comprising a support, a light-sensitive emulsion layer, and an antihalation layer consisting of an interpolymer of vinylbutyl ether and maleic acid anhydride and of an antihalation dyestuff.

5. A photographic material comprising a support, a light-sensitive emulsion layer, and an antihalation layer consisting of an interpolymer of styrene and maleic acid anhydride and of an antihalation dyestuff.

GUSTAV WILMANNS.